United States Patent

[11] 3,604,084

| [72] | Inventors | Fred B. Krieger;<br>Vaughn Rawls, both of Lima, Ohio |
|---|---|---|
| [21] | Appl. No. | 868,534 |
| [22] | Filed | Oct. 22, 1969 |
| [45] | Patented | Sept. 14, 1971 |
| [73] | Assignee | National-Standard Company<br>Niles, Mich. |

[54] ROTARY DETREADER TOOL
7 Claims, 7 Drawing Figs.

| [52] | U.S. Cl. | 29/78, 29/105 |
|---|---|---|
| [51] | Int. Cl. | B23d 71/00, B26d 1/12 |
| [50] | Field of Search | 29/78, 79, 103, 105 |

[56] References Cited
UNITED STATES PATENTS

| 1,316,898 | 9/1919 | Jano | 29/79 |
|---|---|---|---|
| 1,328,034 | 1/1920 | Coe | 29/78 X |
| 1,661,774 | 3/1928 | Smith | 29/78 X |
| 1,888,895 | 11/1932 | Verkuil | 29/103 X |

Primary Examiner—Harrison L. Hinson
Attorney—Johnson, Dienner, Emrich, Verbeck & Wagner

ABSTRACT: A tire-buffing tool for removing the tread impressions from a tire carcass which is rotatably mounted and has a plurality of equally spaced blade members extending radially from its disk-shaped body. Each blade member is pivotally mounted and has a cutting edge facing either direction of rotation.

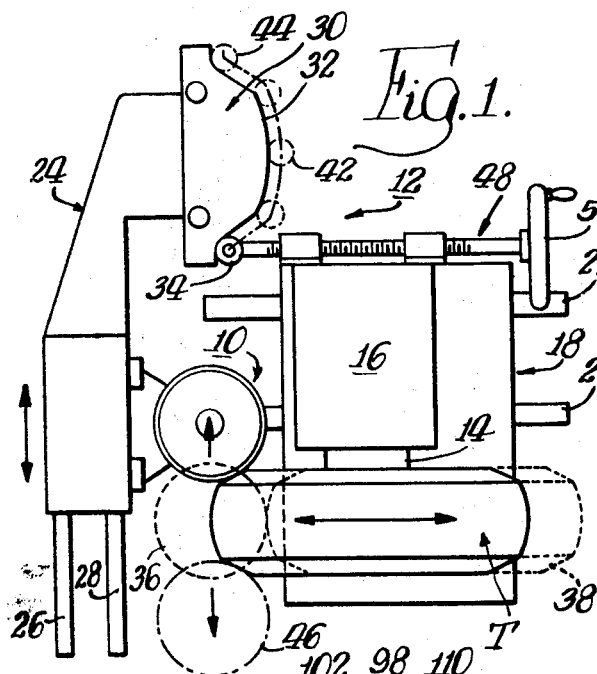
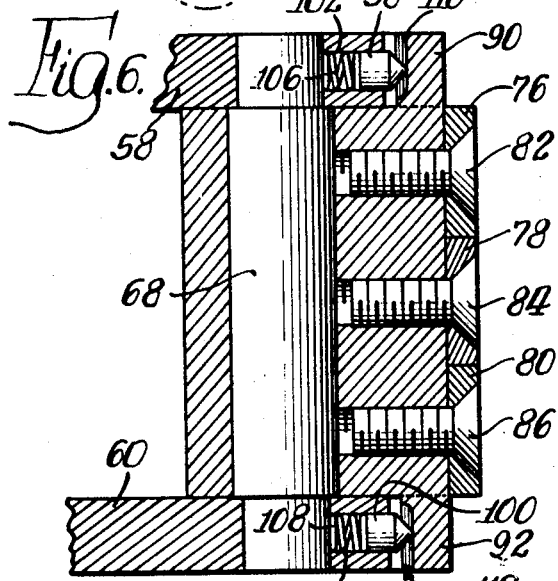
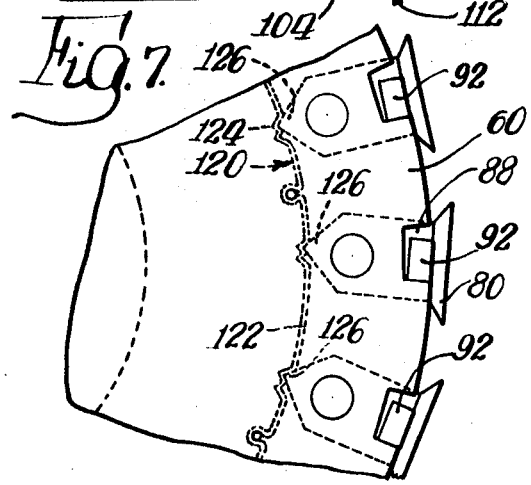
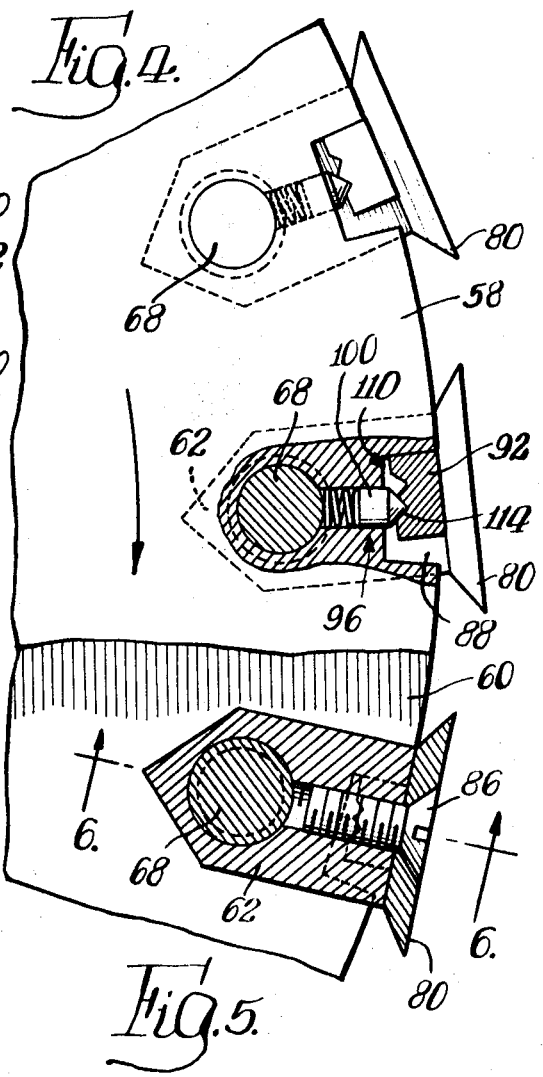
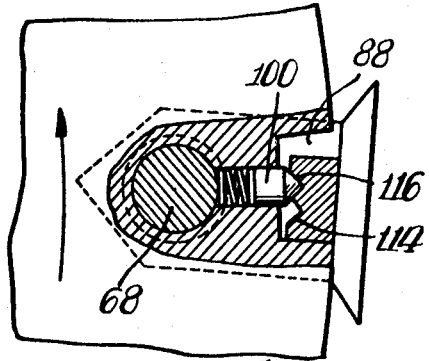
Inventors:-
Fred B. Krieger,
Vaughn Rawls,

PATENTED SEP 14 1971

Inventors:
Fred B. Krieger.
Vaughn Rawls
Attys 3,604,084

ROTARY DETREADER TOOL

BACKGROUND OF THE INVENTION

The first step necessary in preparing a worn tire carcass for retreading is to completely remove the remaining tread compressions on the tire carcass, which operation is called the "buffing" process. The usual manner of performing this operation is to use a rotary-driven detreader wheel having rasplike teeth surrounding its peripheral surface. The detreader wheel is guided in an arcuate path across the tread portion of the worn tire carcass which is simultaneously rotated on an axle member, such that the rasplike teeth rip or shred away a top layer of rubber. One of the major objections to using this type of detreader tool is that the rasplike teeth in shredding the rubber from the tire carcass produce a large volume of rubber dust particles which creates a health hazard for everyone working in the immediate area. Our invention overcomes this problem by using a detreader tool which cuts the thread portion into small strips of rubber of sufficient size that they fall to the ground and avoid causing the previously mentioned health hazard.

Another objection to the rasp-type detreader tool is that it removes more of the rubber from the crown portion than is necessary. It has been found by cutting the tread impressions from the tire carcass into small strips, greater control over the amount of rubber removed can be achieved, and consequently, a better recapped tire can be formed since the tire carcass after buffing has a greater thickness in the crown portion.

An object of this invention is to provide a detreader tool for removing all the remaining impressions on a tire carcass by cutting the rubber from the tread portion into small strips of rubber of sufficient size to avoid dust problems and permit easy pickup.

A further object of this invention is to provide a detreader tool for removing all remaining tread impressions on a tire carcass by using a detreader wheel having a plurality of cutter members extending from its outer surface with cutting edges facing in either direction of rotation.

A still further object of this invention is to provide a detreader tool for removing all tread impressions from a tire carcass by using a detreader wheel having a plurality of pivotally mounted cutter members extending from its outer surface having cutting edges facing either direction of rotation and having lock means for releasably holding the cutter members in their cutting positions such that each cutting edge facing the direction of rotation is swung into a positive cutting position.

SUMMARY OF THE INVENTION

The detreader tool of this invention has a circular disk body configuration with a plurality of cutter members equally spaced around its outer surface. Each cutter member is mounted to the circular body to provide a limited pivotal movement and has an outer blade surface with a cutting edge facing either direction of rotation. The detreader wheel is designed to operate with a conventional tire-buffing machine which has a guide and track mechanism to move the detreader tool across the crown portion of the tire carcass. As the detreader tool is so moved, the cutter edges facing the direction of rotation of the cutting wheel are brought into cutting engagement with the tire carcass' tread portion. When the detreader tool is brought against the tire carcass from an opposite direction, all of the cutter members pivot through a short arcuate path across the radial line extending from the center of the disk body through the pivot point of the cutter member to the opposite offcenter position such that the cutting edge facing the direction of new rotation is in a positive cutting angle with respect to tire and the opposite noncutting edge is in a noncontact position to prevent a dragging frictional force between this noncutting edge and the tire carcass.

BRIEF DESCRIPTION OF THE DRAWINGS

For a better understanding of the present invention, reference may be had to the accompanying drawings in which:
FIG. 1 is a schematic showing of the detreader tool of this invention mounted on a tire-buffing machine and used to remove a portion of the tire tread from a tire carcass T placed on the machine;
FIG. 4 is an enlarged fragmentary view of FIG. 2 showing three of the cutter members;
FIG. 5 is a fragmentary view of FIG. 4 showing the middle cutter member in the opposite pivotal position;
FIG. 6 illustrates a sectional view taken along the lines 6—6 of FIG. 4;
and
FIG. 7 is a modification of the embodiment shown in FIG. 2.

DESCRIPTION OF PREFERRED EMBODIMENTS

Figure 2:
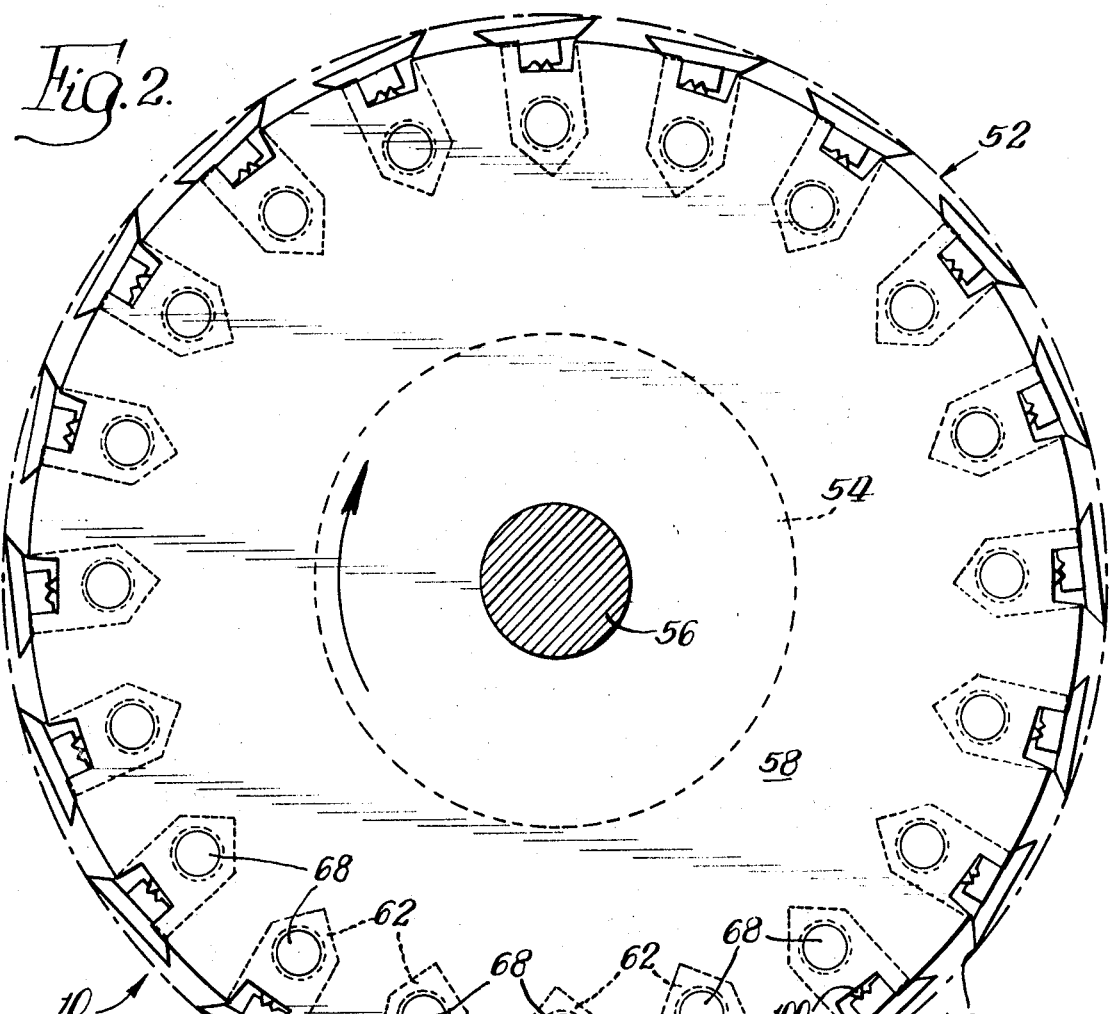
FIG. 2 is a top elevational view of a detreader tool embodying the principles of this invention.

Referring to the drawings, there is shown in FIG. 1 a schematic view of the detreader tool of this invention, generally designated by the reference numeral 10 being used with a tire-buffing machine, generally designated by the reference numeral 12, to remove the tread impressions from a tire carcass T which is rotatably mounted on a constantly driven rim. Since the tire-buffing machine 12 forms no part of this invention, it is only schematically represented and no detailed description of its construction and operation is necessary for an understanding of the disclosure for the subject invention. For a complete description of the tire-buffing machine 12 represented in FIG. 1, reference may be had to Stull U.S. Pat. No. 3,162,233.

Briefly, the tire-buffing machine 12 operates as follows. The tire carcass T is supported on a constant speed driven shaft member 14 which is supported on a pedestal 16. A tire carriage 18 supports and carries the pedestal 16 and tire carcass T along the parallel tracks 20 and 22. A buffing wheel carriage 24 is adapted to move in a direction perpendicular to the tire carriage 18 to move the detreader tool 10 back and forth along the tracks 26 and 28. The transversely moving buffing wheel carriage 24 supports a template 30 having the profile of the tire casing. The template follower 34 in the form of a roller supported by the tire carriage 18 bears against the camming surface 32 of the profile template 30. The casing profile template 30 may be replaced by other templates for use with tire casings of different cross sections. An examination of the schematic drawing of FIG. 2 will show that the template 30 and follower 34 control the path through which the tire casing T moves with respect to the rotating buffing wheel 10. With the transverse movement of the buffing wheel carriage 24, the buffing wheel 10 moves in a straight line and initially occupies the position indicated in full in FIG. 1. The movement of the carriage 24 to a central position of its path to occupy the position in the phantom line circle 36 will cause the tire T to move to the right of FIG. 1 and occupy position 38. At this time, the cam follower 34 will have moved to position 42. When the cam follower 34 reaches position 44, the buffing wheel 10 occupies position 46 in which position buffing of the sloping sidewall of the tire casing occurs. In the preferred manner of operating the buffing machine 12, the buffing wheel 10 automatically completes two full passes across the profile of the tire T to complete a cycle. An adjusting means 48 is provided for moving the template follower 34 with reference to its supporting carriage 18 toward and away from the casing profile template member 30. The adjusting means 48 may be regulated manually by hand wheel 50.

Figure 3:
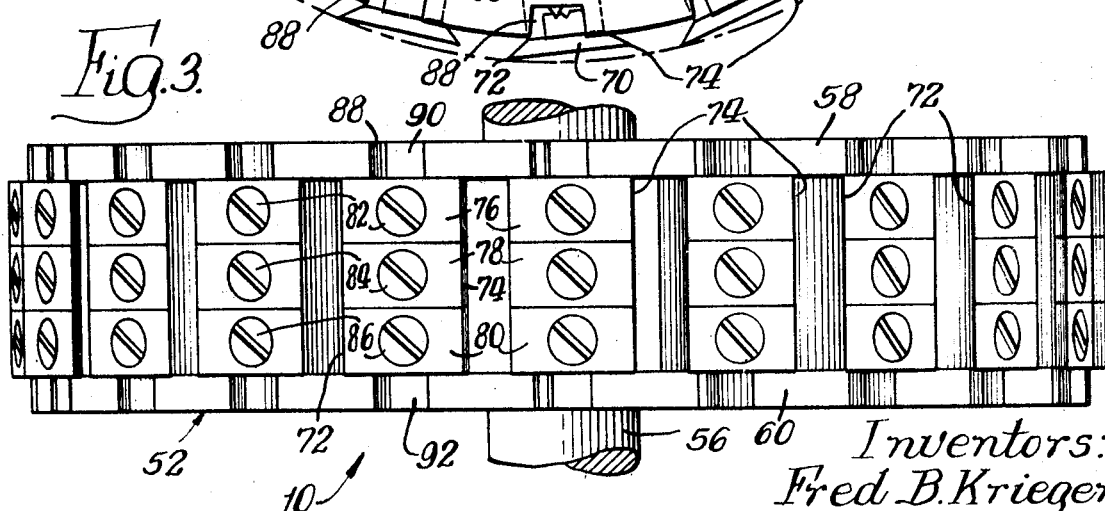
FIG. 3 is a front view of the FIG. 2 embodiment.

There is shown in FIGS. 2 and 3, one embodiment of the detreader tool or wheel 10 having a circular disk-shaped body 52. The disk body 52 has a central drum 54 with an opening formed along its center axis for receiving a drive shaft member 56. Circular flanges 58 and 60 are secured to the opposite ends of drum 54 (See FIG. 3). A plurality of cutter members generally designated by the reference numeral 62 are disposed around the circular disk body 52 at its outer edge in an equal space relationship and are pivotally mounted between flanges 58 and 60 by a shaft, generally designated by the reference numeral 68 which extends through a circular bore adjacent their innermost ends. Each of the cutter members 62 is identically constructed having a cutter carrier block, generally designated by the reference numeral 66, whose length is slightly less than the distance between flanges 58 and 60. Attached to the outer surface of each cutter block 66, which is substantially flush with the outer periphery of the flanges 58 and 60, is a cutter blade generally designated by the reference numeral 70, having cutting edges 72 and 74 to provide a cutting surface for either direction of rotation of detreader wheel 10. It is preferred that the cutter blade 70 be readily removable for replacement purposes, and in the embodiment shown in the drawings, the cutter blade consists of three blade segments 76, 78 and 80 which are, respectively, mounted to the outer surface of cutter block 66 by means of three screws 82, 84 and 86 which are threaded into aligned threaded apertures formed in the front surface of the cutting block (not shown). The purpose for having three cutting segments for each cutter member 62 is to avoid replacing the whole cutter blade whenever a portion of its cutting edge strikes a hard foreign object lodged in the tire carcass T, such as a nail.

It can be seen from the brief description of the tire-buffing machine 12 that it is necessary to have a double cutting edge for each cutter member 62 since the conventional machines, including both automatic and manually operated, rotate the cutting wheel in one direction as it buffs across the tire carcass in one direction and rotates the detreader wheel in the opposite direction on the return sweep of the wheel across the tire carcass in the other direction. The purpose for pivotally mounting each cutter member 62 is to cause them to rotate through a short arcuate path to place the cutting edge facing the direction of rotation in a positive cutting angle and to position the opposite cutting edge in a noncontact position. One of the benefits achieved by this pivotal action is to avoid undue frictional contact and wear with the noncutting edge.

The pivotal movement of each cutter member 62 is stopped in a novel and unique manner. In each of the circular flanges 58 and 60, there are a plurality of rectangular-shaped recesses cut into the outer periphery which are equal in number to the cutter member 62 and are in direct alignment with the same. It can be seen that a radial line extending from the center of the drum 54 and passing through the center of the pivot pin 68 will approximately bisect the recesses 88 into two equal halves. Each cutter member 62 has upper and lower studs generally designated by the reference numerals 90 and 92, extending from its upper and lower ends, respectively.

It can be appreciated that each of the cutter members 62 will be pivoted to the offcenter position where the cutting edge facing the direction of rotation will be brought into positive cutting engagement with the crown portion of the tire carcass T. For example, when the detreader wheel or tool 10 is rotating clockwise as viewed in FIG. 2, each of the cutter members 62 upon engaging the tire casing will pivot counterclockwise until the studs 90 and 92 strike the right side of recess 88, as shown in FIG. 2. It can be seen from FIG. 2, that the noncutting edge 74 of each cutter member 62 is a noncontact position to avoid any frictional engagement with the tire carcass T.

To avoid undue wear on the cutter members 62, it is preferred that after each cutter member 62 has been pivoted to one of the offcenter positions that they be locked in this position until the detreader wheel 10 is rotated in the opposite direction and contacts the tire carcass to shift each cutter member 62 to the opposite pivotal position. To lock each cutter member 62 into the offcenter position, each cutter member is provided with a locking device generally designated by the reference numeral 96. The locking device 96, as best shown in FIGS. 4 and 6, consists of locking elements 98 and 100 which slidably fit in bores 102 and 104 formed in flanges 58 and 60 at the midpoint of each recess 88.

The cutter member locking elements 98 and 100 have pointed ends which are biased outwardly by springs 106 and 108, respectively, to urge the locking elements 98 and 100 towards detent elements 110 and 112, respectively, formed on the back surface of studs 90 and 92. As shown in FIG. 4, when the detreader wheel 10 is rotated clockwise, each cutter member 62 is pivoted counterclockwise upon contacting the tire carcass T forcing locking element 98 to ride into V-shaped groove 114 of detent element 110. When the detreader tool 10 is caused to rotate in the counterclockwise position, each cutter member 62 is rotated clockwise causing the pointed end of locking element 96 to ride out of V-groove 114 of detent element 110 and into locking V-groove 116.

There is shown in FIG. 7, an alternative arrangement of providing a locking device 120 for each of the cutter members 62. A circular ring 122 of a strong resilient material is mounted on the inside surface of flanges 58 and 60 (only flange 58 being shown) and this ring has a series of V-shaped pairs of slots, generally designated by the reference numeral 124, for each cutter member 62 which cooperates with its pointed inner end 126 in a similar manner to the FIGS. 4 and 6 locking arrangement.

It can be appreciated from the above description, that the detreader tool of this invention is an improved apparatus for buffing the crown portion of a tire carcass. It permits the rubber to be removed in small strips thus eliminating the previous dust problem and pickup problem. It also permits greater control over the amount of rubber being removed from the tire carcass, thus leaving a much stronger tire base upon which to rebuild a tire construction.

I claim:

1. A detreader tool for use with a tire-buffing machine to remove all tread impressions from a tire carcass, comprising a disk body having a bore formed through its center section for receiving a shaft extending along its axis, a plurality of cutter members disposed around the outer periphery of said disk body, each of said cutter members having a blade projecting beyond the outer margin of said disk body, each of said blades having a cutting edge facing the two directions of rotation of said disk body.

2. A detreader tool as defined in claim 1 wherein, each of said cutter members are pivotally mounted to said disk body such that the cutting edge of said blades facing the direction of rotation of said disk body upon contacting the crown portion of the tire carcass moves away from, and the opposite cutting edge of said blade surface moves towards said outer periphery of said disk body, and means for stopping the pivotal movement of each of said cutter members at an offcenter position on either side of the radial line of said disk body extending through the pivot point of each cutter member.

3. A detreader tool as defined in claim 2, further comprising locking means for releasably holding each of said cutter members in either of said offcenter positions.

4. A detreader tool as defined in claim 3, wherein said locking means comprises a locking element having a pointed end carried by each of said cutter members and a plurality of pairs of detent elements disposed around said disk body, each pair of said detent elements cooperating with one of said locking elements to engage its pointed end when said blade member moves to one of said offcenter positions and spring means for biasing said locking elements and said detent elements into a locking relationship.

5. A detreader tool for use with a tire-buffing machine to remove all tread impressions from a tire carcass comprising a cylindrical drum having a bore formed along its axial center for receiving a shaft to rotate the detreader tool and having circular flanges secured to its opposite ends, a plurality of cutter members disposed around and pivotally connected between said flanges adjacent their outer edges, each of said cutter members having a blade projecting beyond the outer margin of said circular flanges and adapted to swing about said pivotal connection, each of said blades having a cutting edge facing both directions of rotation of said drum, and means for stopping the pivotal movement of each of said cutter members at an offcenter position on either side of the radial line of said drum extending through the pivot point of each cutter member.

6. The detreader tool as defined in claim 5, wherein said stopping means comprises a series of recesses formed in the peripheral surfaces of each of said flanges of the same number as said cutter members in radial alignment with each of said pivotal connections and a stud extending from opposite ends of said cutter members and adapted to move in the corresponding recesses of said flanges as its cutter member pivots, whereby the pivotal movement of each cutter member is stopped when said studs strike the one of the ends of the recess in which it is located.

7. A detreader tool as defined in claim 5, wherein each of said blades includes a plurality of blade elements removably fastened to the outer end of said cutter member, each of said blade elements having a cutting edge facing both directions of rotation.